United States Patent [19]

Wessling et al.

[11] 4,431,768

[45] Feb. 14, 1984

[54] AQUEOUS COMPOSITIONS CONTAINING ORGANIC POLYMERS CURABLE AT LOW TEMPERATURES IN THE WET STATE

[75] Inventors: Ritchie A. Wessling; Thomas C. Klingler, both of Midland, Mich.

[73] Assignee: The Dow Chemical Company, Midland, Mich.

[21] Appl. No.: 374,828

[22] Filed: May 4, 1982

[51] Int. Cl.³ ........................... C08J 9/00; C08L 1/00; C08L 41/00
[52] U.S. Cl. ..................................... 524/543; 521/65; 521/66; 521/70; 524/2; 524/458; 524/460; 524/515; 524/547
[58] Field of Search ............... 524/458, 460, 543, 547, 524/2, 515

[56] References Cited

U.S. PATENT DOCUMENTS

| | | | |
|---|---|---|---|
| 3,179,638 | 4/1965 | Shashoua | 524/458 |
| 3,630,834 | 12/1971 | Bremmer et al. | 162/164 |
| 3,873,488 | 3/1975 | Gibbs et al. | 524/458 |
| 3,998,776 | 12/1976 | Wagener et al. | 524/458 |
| 4,056,501 | 11/1977 | Gibbs et al. | 524/460 |
| 4,337,185 | 6/1982 | Wessling et al. | 524/458 |

*Primary Examiner*—Ronald W. Griffin
*Attorney, Agent, or Firm*—I. A. Murphy

[57] ABSTRACT

Aqueous acidic compositions which contain a combination of an organic polymer having a bound latent source of thiolate ions, such as isothiouronium groups and an organic polymer having bound cationic onium groups, such as sulfonium groups, or a polymer containing both kinds of groups can be cured in the wet state by raising the pH to above about 9 at a temperature from about 0° C. to about 100° C.

15 Claims, No Drawings

AQUEOUS COMPOSITIONS CONTAINING ORGANIC POLYMERS CURABLE AT LOW TEMPERATURES IN THE WET STATE

BACKGROUND OF THE INVENTION

1. Field of the Invention

The invention is concerned with compositions which contain at least one aqueous solution or dispersion of an organic polymer which can be coated on or impregnated in a substrate or fabricated into articles of manufacture and which can be cured in the wet state at low temperatures such as at or near ambient temperature.

2. Description of the Prior Art

The development of latexes for various uses has progressed sufficiently that considerable information is available to the skilled in the art concerning the preparation, characteristics, uses and methods of use of numerous kinds of latexes. While some self-curing latex compositions are known, generally rather high temperatures are required to achieve a high degree of cure. It would be advantageous to have new compositions which are readily curable at low temperatures, such as at or near ambient room temperature, to provide water resistant and hydrophobic products.

Aqueous solutions of organic polymers which cure at low temperatures are also of interest. Organic polymers having bound tetralkylisothiouronium groups and organic polymers having bound sulfonium groups or other pH independent cationic groups have been prepared and described. However, no suggestion has been found that they could be combined in such a manner as to attain the advantage of the present invention.

SUMMARY OF THE INVENTION

This invention involves aqueous compositions and a process for using such compositions to provide low temperature curing of coated, impregnated or fabricated articles made from the compositions. The compositions are cured by raising the pH of an acidic aqueous solution or an aqueous colloidal dispersion containing organic polymers having a latent source of thiolate ions bound to the polymer and bound cationic ions which are subject to displacement reactions with a thiolate ion, adjusting the pH to a basic value above about 9 and allowing the mixture to stand at ambient temperature or a temperature from about 0° C. to about 100° C. The groups providing the source of thiolate ions and the cationic ions which are subject to displacement reactions may be on the same or different polymer.

DESCRIPTION OF THE PREFERRED EMBODIMENTS

The compositions and process of this invention require (a) a polymer containing cationic onium groups such as sulfonium which are subject to displacement reactions with a thiolate ion, (b) a polymer containing a latent source of thiolate ions and (c) a base with which to raise the pH. Preferably at least one of the two kinds of polymers (1) is in the form of an acidic latex or (2) both kinds of groups are bound to a polymer which is in the form of a latex.

The term "bound to the polymer" (or similar expression) with respect to ionic groups or charges refers to ionic groups or charges which are chemically bonded to the polymer or are not desorbable from the polymer when in the form of a latex particle.

The cationic onium groups useful in this invention are those that undergo displacement reactions with thiolate ions. They include the sulfonium and quaternary ammonium ions. Those operable in this invention react, at least in part, to form a sulfide bond between the onium functional polymer and the thiolate group. Sulfonium groups are preferred for fastest cure at lower temperatures. The quaternary ammonium groups are useful in cures where longer pot life is needed.

Latent sources of thiolate ions include any group that decomposes in water at pH greater than about 8 to form thiolate ions. Respresentative are the isothiouronium salts and the thiolesters. Those operable in this invention form thiol groups and thiolate ions with the sulfur bonded to the polymer substrate on which the starting group was bonded.

Reaction between the above-described groups will result in bond formation between the respective polymeric species. If the groups are attached to different molecules, the reaction will result in an increase in molecular weight or cross-linking depending on the functionality of the polymers. In all cases, the cationic charge is destroyed and the product is no longer soluble or colloidally dispersible in water.

It is preferred that the major amount of both the onium ion and the latent thiolate source is bound to a polymeric species, most preferably with a functionality of two or more. The process is operable if both the onium group and the thiolate ion are on the same molecule, but best results are obtained in most cases when they are attached to separate substrates.

Illustrative combinations of onium ion and latent thiolate source include the following classes:

I. Water-soluble polyvinylbenzyldimethyl sulfonium polymer and a latex having a polymeric component which has primarily bound tetraalkylisothiouronium groups.

II. A water-soluble sulfonium polymer and a latex stabilized with an isothiouronium polymeric surfactant;

III. A latex having a polymeric component stabilized primarily by sulfonium groups bound thereto and a latex having a polymeric component which has primarily bound tetralkylisothiouronium groups;

IV. A latex comprising a polymeric component having bound sulfonium groups and a water-soluble polymer having bound tetralkylisothiouronium groups, V. A latex comprising a polymer having bound sulfonium groups and bound tetraalkylisothiouronium groups and VI. A high molecular weight polyacrylamide containing sulfonium or quaternary ammonium groups and a low molecular weight polyvinylbenzyl isothiouronium polymer.

A preferred composition is a combination of a water-soluble alkyl sulfonium substituted polymer and a polyvinylbenzyl tetraalkylisothiouronium latex.

The polymer backbone with which the cationic groups and the latent thiolate ion groups preferably are associated is determined by the application. The properties of the product or polymeric binder in a composite product depend both on backbone compositions and degree of cross-linking. The latter is determined by the molecular weight, the number of functional groups per molecule and the efficiency of coupling in the curing reaction. Hydrophobic base polymers yield hydrophobic water-resistant products; for illustration, a polystyrene/vinylbenzyl sulfonium copolymer reacted with an isothiouronium functional latex. Hydrophilic backbones, as for example, cationic polyacrylamide containing sulfonium and isothiouronium groups yield a hydrophilic cross-linked product which is water swellable. Soft polymers having low glass transition temperatures produce rubbery cross-linked products; for illustration, for foam rubber, a styrene/butadiene latex with high butadiene content is preferred. For coatings and adhesives, hard tough compositions such as low molecular weight polymers based on epoxy resins are preferred. Useful adhesives for specific substrates also can be made with functionalized low molecular weight polyvinyl acetates and polybutadienes.

The base for raising the pH may be, for example, ammonium hydroxide, an alkali metal hydroxide, magnesium hydroxide, calcium oxide, sodium carbonate, sodium bicarbonate and tetrasodium pyrophosphate. Other sources of basic anions can be used, such as anion exchange beads in hydroxide ion or bicarbonate ion form.

The base may be introduced into the formulation either as a solid or solution.

The selection of base is normally determined by the process and the product to be made. In latex-modified concretes and mortars, for example, the source of base may be the cement itself, such as Portland cement and magnesium oxychloride cement. In other cases, ammonia vapor or aqueous ammonia may be used to advantage.

Alkalinity may also be induced locally on or near an electrode surface by electrolysis of water. This method is especially useful in applying cross-linked coatings by cathodic electrodeposition and for electrophoretic impregnation of porous sheets.

There are various ways to employ the process to form cured and fabricated or impregnated articles. In one embodiment, the polymers and inert ingredients are blended to a uniform consistency with solids content of from 25 to about 80 percent. The base is then added with vigorous agitation to obtain a uniform fluid reaction mixture. The mixture is then converted to the desired form before solidification occurs. Conveniently, because of the high rates of cure realizable by this method, the mixing is carried out continuously in an in-line mixing head with output feeding directly to the fabrication step. The latter includes both coating a substrate and filling a mold. When foamed products, such as a foam backing on carpet are desired, the reaction mixture may be formulated with foaming agents and thickeners and air whipped in to produce a froth before solidification. If nonfoamed products such as polymer-modified cements are desired, it may be advantageous to formulate the mixture with an antifoam agent.

Polymer/fiber composites such as latex-modified paper are prepared either by a wet end process or by saturation of a preformed fibrous web. In the wet end method, a dilute mixture (0.5–10 percent) of polymeric component is added to a dilute pulp slurry in water at 0.01 to ~2 percent with agitation. The pH of the uniform mixture is then raised to greater than 8 to simultaneously flocculate and cross-link the solids. The solids are collected on a screen, pressed, dewatered and heated, if desired, for drying and additional cure. Because the cure takes place initially in the wet state, the web coming off the screen has excellent strength.

A mixture of fibers, fillers, pigments and other additives is added to the pulp slurry before flocculation to obtain various composites. Products with fiber contents of from about 5 to about 99 percent and polymer contents of from about 1 to about 95 percent can be prepared. High levels of polymer yield fiber reinforced plastic sheets; low levels yield polymer-modified papers.

In saturation, conventional methods can be used to impregnate a porous web with polymer by using a slow curing formulation. For fast cure, the components are best added sequentially. For example, the sheet is first treated with caustic, then with sulfonium polymer and finally with isothiouronium polymer. Alternatively, the sheet may be impregnated with a mixture of polymers and then contacted with a source of base to effect solidification and cure. Sequential operations can also be used to advantage in adhesive or coating applications. In adhesives, for example, the surfaces to be joined are first treated with base, then coated with a polymer mixture and immediately pressed together. The method is primarily applicable to porous or water-permeable substrates such as wood and masonry.

The following examples illustrate ways in which the present invention can be practiced, but should not be construed as limiting the invention. All parts and percentages are by weight unless otherwise expressly indicated. Particle sizes shown are average particle diameters obtained by light scattering measurements, except as indicated.

EXAMPLE 1

A latex is prepared substantially as described in Examples III and XI of U.S. Pat. No. 4,056,501 by subjecting to emulsion polymerization conditions 30 parts of styrene, 63 parts of butadiene and 2 parts of hydroxyethyl acrylate until most of these monomers are polymerized (about 90 percent conversion), adding 5 parts of vinylbenzyl chloride and maintaining emulsion polymerization conditions until substantially complete polymerization occurs, then the product is cooled. An excess of tetramethylthiourea is mixed therewith and the mixture is allowed to stand at about 30° C. for about 8 days, then is dialyzed and subjected to steam distillation. The product (Latex 1-A) is a stable, structured particle latex having 30 percent of solids and containing 0.2 milliequivalent of tetramethylisothiouronium ion per gram of latex solids.

With Latex 1-A (51 g, solids basis) is added 7 grams (solids basis) of an aqueous solution at 20.7 percent of solids of the reaction product of polyglycidyl methacrylate, dimethyl sulfide and acetic acid, the aqueous solution having an activity of 0.78 milliequivalent of sulfonium per gram of reaction product and 1 gram of dodecylbenzyltrimethylammonium chloride. The resulting mixture is whipped with a mixer (Hamilton-Beach) until the froth volume is about 200 cc and 4 grams of sodium carbonate is added as a dry powder. After thorough mixing, the formulation is allowed to stand at room temperature. In about 2 minutes a stable foam is apparent. After standing overnight the foam is tough and resilient.

EXAMPLE 2

A pulp slurry is prepared from deionized water and bleached softwood kraft in which the concentration of pulp is 1 percent.

A latex (Latex 2-A) is prepared from 60 parts of styrene, 35 parts of butadiene and 5 parts of vinylbenzyl chloride substantially as described in Example III of U.S. Pat. No. 4,056,501.

A sulfonium latex (Latex 2-B) is prepared from Latex 2-A substantially as described for Latex III-B of the patent noted above and is diluted to a solids content of 10 percent.

An isothiouronium latex is prepared from Latex 2-A substantially as described for Example XI of the same patent and is diluted to a solids content of 10 percent.

A test for determining the optimum ratio for using the latex in wet end addition to pulp in a paper making process is carried out by blending various ratios of the latexes, diluting the blend to a solids content of 1 percent, raising the pH to 13 with 1N sodium hydroxide, then vigorously shaking the blend and allowing the resulting coagulum to settle. The optimum ratio is selected by observing the ratio which produces a clear serum.

For a blend of Latex 2-B and Latex 2-C, the optimum ratio is found to be 1.4 parts of Latex 2-C (tetramethylisothiouronium) per part of Latex 2-B (sulfonium).

The pulp slurry, sulfonium latex, isothiouronium latex, and sodium hydroxide are mixed in the amounts and in the order shown in Table I. The results are shown in Table II.

TABLE I

| Example No. | 1 Pulp Slurry g (a) | 2 Sulfonium Latex (b) g | 3 Isothiouronium Latex (b) g | 4 NaOH 1N cc | Order of addition (c) | Ratio Latex/pulp (e) |
|---|---|---|---|---|---|---|
| 2-1 | 100 | 2.5 | 3.5 | 2 | 1,2,3,4 | 0.6 |
| 2-2 | 100 | 4 | 5.6 | 2 | 1,2,3,4 | 0.96 |
| 2-3 | 100 | 5 | 7. | 2 | 1,4,2,3 | 1.2 |
| 2-4 | 100 | 15 | 20. | 2 | 1,2,4,3 | 3.5 |
| *C2-1 | None (d) | 4 | 5.6 | 2 | 1,2,3,4 | — |
| *C2-2 | 100 | None | None | 2 | 1,2 | — |

(a) = at 1 percent solids.
(b) = at 10 percent solids.
(c) = according to the numbers at the top of the columns.
(d) = substituted 100 g of deionized water.
(e) = solids basis
* = comparative example and not an example of the invention.

TABLE II

| Example No. | Characteristics |
|---|---|
| 2-1 | Filtered rapidly to dense cake, clear serum, paper-like mat, when dry, which was not sticky. |
| 2-2 | Filtered very rapidly, clear serum, paper-like product. |
| 2-3 | Filtered very easily, no white water, good sheet formation, not tacky. |
| 2-4 | Filtered easily, clear white water, paper-like product which was somewhat tacky. |
| C2-1 | Clear serum, product was a rubbery plug of hydrophobic polymer. |
| C2-2 | Filtered slowly, product was loose mat highly swollen with water. |

EXAMPLE 3

A magnesium oxychloride cement is prepared by first mixing uniformly in a blender the ingredients shown in Table III and with the resulting mixture is blended 100grams of magnesium oxide at high speed for 3 minutes. The fluid product is poured into molds and held at ambient temperature to harden.

TABLE III

| | Grams | Grams Dry Basis |
|---|---|---|
| $MgCl_2.6H_2O$ | 100 | 100 |
| Water | 60 | — |
| Isothiouronium Polymer (a) | 30 | 5 |
| Sulfonium-containing Latex (b) | 82 | 40 |

(a) a polymeric surfactant made by reacting a copolymer of vinylbenzyl chloride and methyl methacrylate with tetramethyl thiourea.
Base polymer
$M_n = 13,400$
$\frac{M_w}{M_n} = 1.66$
As aqueous solution, 16.3 percent active
Meq. of $Cl^-$/g of solution  0.425
Meq. of $H^+$/g of solution  0.049
Meq. of isothiouronium ion/g of solution  0.376
(b) Like Latex 2 (b) except concentrated to 48.6 percent solids by vacuum stripping rather than diluted.

The cured product has improved toughness and water resistance as compared with an unmodified cement.

What is claimed is:

1. An aqueous mixture of a low temperature curable, organic polymeric composition comprising (A) an organic polymer having a bound latent source of thiolate ions and bound cationic onium groups which are subject to displacement reactions with a thiolate ion, or a combination of (B) an organic polymer having a latent source of thiolate ions bound to the polymer and (C) an organic polymer having bound cationic onium groups which are subject to displacement reactions with a thiolate ion; said organic polymer (A) and at least one of organic polymers (B) and (C) having a sufficient amount of the bound onium groups to provide dispersion stability or cause the polymer to be water-soluble.

2. The aqueous mixture of claim 1 in which at least one component is in the form of a latex.

3. The aqueous mixture of claim 1 in which the organic polymer is water-soluble in the absence of a reactive group.

4. The aqueous dispersion of claim 1 in which the latent source of thiolate ions is a tetraalkylisothiouronium group.

5. The aqueous dispersion of claim 1 in which the cationic onium groups which are subject to displacement reactions are sulfonium groups.

6. A method for curing at low temperature an organic, polymeric composition comprising
    (1) providing an aqueous composition having an acidic pH comprising at least one polymer having a latent source of thiolate ions bound to a polymer and cationic onium groups bound to a polymer which are subject to displacement reactions with a thiolate ion; said latent source of thiolate ions and said cationic onium groups which are subject to displacement reactions with thiolate ions being on the same polymer or on different polymers;
    (2) Raising the pH of the aqueous composition above about 9;
    (3) Allowing the resulting mixture to stand at a temperature of from about 0° to about 100° C.

7. The method of claim 6 in which at least one polymer is in the form of a latex.

8. The method of claim 6 in which at least one polymer is water-soluble in the absence of a reactive group.

9. The method of claim 6 in which the aqueous composition comprising the polymer is provided by mixing in aqueous media, a polymer having a latent source of thiolate ions bound thereto with a polymer having bound cationic onium groups which are subject to displacement reactions with a thiolate ion.

10. The method of claim 6 which has the additional steps of (a) frothing the acidic aqueous composition and after the raising of the pH (b) allowing the froth to convert to a stable foam.

11. The method of claim 6 in which the pH is raised by mixture with an alkaline cement.

12. The method of claim 8 in which the cured product remains hydrophilic.

13. The method of claim 6 having the additional step of mixing the acidic aqueous dispersion with an aqueous dispersion of fibers.

14. The method of claim 6 with the added step of impregnating a porous substrate.

15. The method of claim 6 having the additional step immediately following step 2 of coating the aqueous dispersion onto a substrate.

* * * * *